Oct. 23, 1928. Re. 17,107

J. A. SPENCER

SADIRON

Original Filed June 29, 1922 2 Sheets-Sheet 1

WITNESSES:
E. A. McCloskey
H. M. Bickel

INVENTOR
John A. Spencer
BY
Wesley G. Carr
ATTORNEY

Oct. 23, 1928. Re. 17,107

J. A. SPENCER

SADIRON

Original Filed June 29, 1922 2 Sheets-Sheet 2

WITNESSES:
E. A. McCloskey.
H. M. Bichel

INVENTOR
John A. Spencer.
BY
Wesley G. Carr
ATTORNEY

Reissued Oct. 23, 1928. Re. 17,107

UNITED STATES PATENT OFFICE.

JOHN ALBY SPENCER, OF REVERE, MASSACHUSETTS, ASSIGNOR TO SPENCER THERMOSTAT COMPANY, OF CAMBRIDGE, MASSACHUSETTS, A CORPORATION OF MASSACHUSETTS.

SADIRON.

Original No. 1,491,363, dated April 22, 1924, Serial No. 571,802, filed June 29, 1922. Application for reissue filed March 5, 1926. Serial No. 92,605.

The present invention relates to sadirons and more particularly to sadirons of an improved type in which apparatus is embodied for automatically regulating the temperature.

It is the object of the present invention to improve the construction and operation of apparatus of this type in such a manner that intimate and automatic control of the temperature may be obtained without unduly complicating the structure of the iron.

Figure 1:
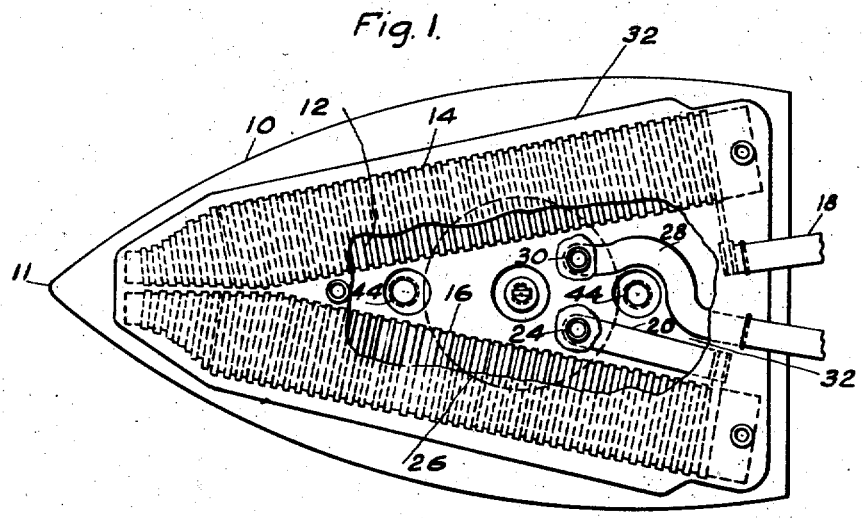
Figure 2:
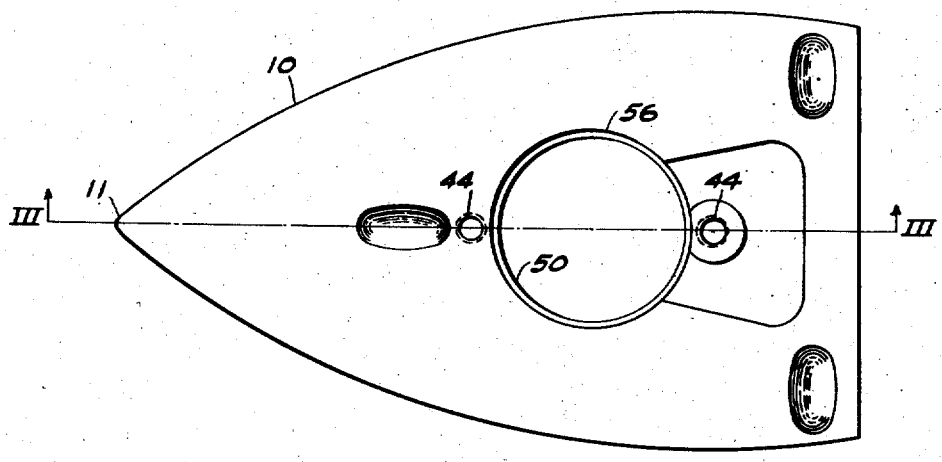
Figure 3:
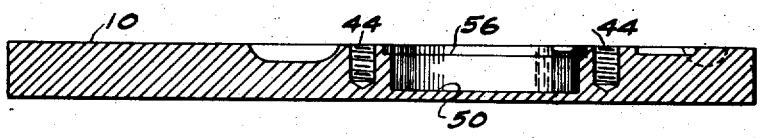
Figure 4:
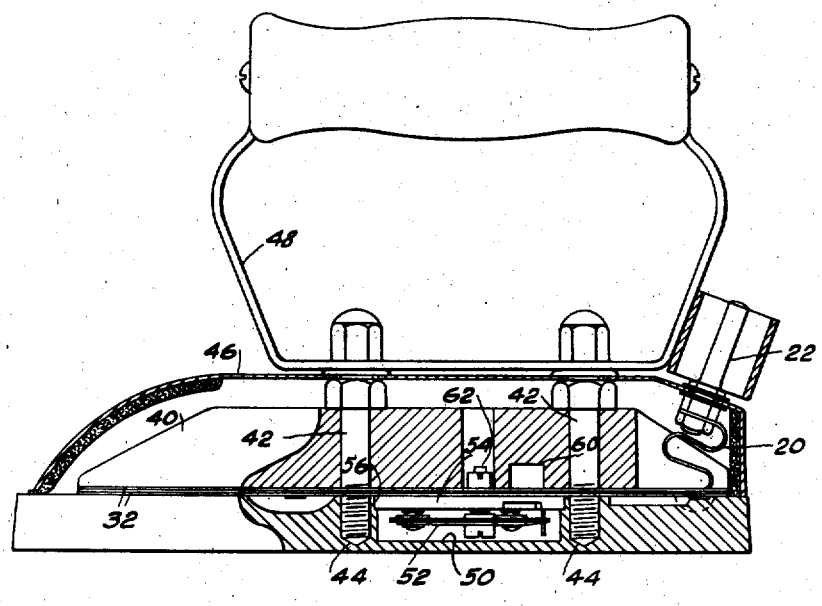

With this object in view the features of the invention consist in certain novel features of construction, combinations and arrangements of parts hereinafter described and claimed, the advantages of which will be obvious to those skilled in the art from the following description:

In the accompanying drawings illustrating the preferred form of the invention, Fig. 1 represents a plan view of the base portion of a sadiron embodying the features of the invention, together with the associated heating element and thermostatic control; Fig. 2 is a plan view of the base with the heating element and thermostatic control removed therefrom; Fig. 3 is a section in elevation of the base member shown in Fig. 2; and Fig. 4 represents a section in elevation of an entire sadiron assembly embodying the invention.

The illustrated embodiment of the invention shows a sadiron having a metallic base member 10 provided with a pointed end 11 of the usual form. Supported on top of the base member is a heating element indicated generally at 12 and consisting of a spiral of flat resistance wire 14 wound upon a strip of mica 16 or similar material. As indicated in Fig. 1, the heating element comprises essentially two strips of insulating material with the resistance wire wound thereon connected at their forward ends to form substantially a triangle. The heating element as a whole is arranged in such a manner that the pointed end of the triangle is located above and in proximity to the forward end of the iron. With this construction, it will be evident that a proportionately large number of turns of resistance wire are located in the region above the forward end of the iron so that a proportionately large volume of heat is given off by the heating element in this region, thus maintaining the pointed end of the base, which tends to cool rapidly, at the desired operating temperature.

The free ends of the heating spiral are electrically connected, as shown in Fig. 1, with flat leads 18 and 20, which in the ordinary commercial iron are connected with the terminal plug through set screws 22, the terminal plug being located upon the rear portion of the casing in such a position that a connection may be readily made. In the present construction, the lead 20 is connected to one terminal 24 of the thermostatic element indicated at 26. Connection is made from the thermostatic element to the terminal plug through an additional lead 28 connected to the thermostatic element by a terminal 30.

The heating element as a whole is ordinarily interposed between sheets of mica 32 or similar material and the entire assembly is clamped to the base member 10 by a weight member 40, the weight member being secured in place by through-bolts 42, which pass through the weight member and are tapped into holes 44 formed in the base. The bolts 42 also serve to retain the usual shell 46, and the handle 48 in the proper assembled relation to the base member.

According to the present construction, a thermostatic control is embodied in the sadiron for automatically cutting the heater circuit in and out when predetermined temperature limits of the sadiron are reached. In order to embody the thermostatic control in the sadiron, it is only necessary to form a circular recess 50 in the base member, as indicated clearly in the drawings, this recess serving to support a thermostatic assembly, which may be similar in detail to the thermostatic control illustrated in the copending application of Spencer, Serial No. 565,255, filed June 1, 1922. As indicated in this application, this control comprises essentially a thermostatic disk 52, which is supported by a disk 54 of insulating material, the disk 54 being seated in an enlarged portion 56 of the recess 50, the lower portion of the recess receiving the thermostatic disk and associated elements.

As indicated clearly in Figs. 2 and 3, the opening for the thermostatic assembly is formed in the base of the sadiron between the threaded openings 44 and in approximately the center of mass of the base. When the thermostatic assembly is positioned in the recess, as indicated, and the heating element assembled in the proper relation to the base, the terminals 24 and 30 are located between the inclined legs of the heating element and in a convenient position to be connected respectively with the lead 20 and the lead 28. Furthermore, the thermostatic element when located in this position is controlled by a temperature which corresponds to the average temperature of the base as a whole, rather than the temperature of some isolated part of the base, as the pointed end for example. On the other hand, the location of the thermostatic assembly in approximately the central portion of the iron causes the thermostatic control to cut off the heating current of any portion of the base, such as the pointed end, immediately upon reaching the predetermined upper limit of temperature.

In order to accommodate the projecting terminals 24 and 30 of the thermostatic assembly, the weight member 40 may be recessed, as indicated at 60. An additional recess or opening may also be provided in the weight member to accommodate the adjusting member 62. By forming and locating the thermostatic assembly in this manner, it will be evident that it may be embodied in a sadiron by merely providing recesses of the proper shape and dimension in the base and weight members, the thermostatic assembly as a whole being held in place by the weight member when the latter is clamped onto the base by the through-bolts 42.

From the foregoing it will be evident that the electrical resistance elements and the thermostat are clamped together by means including the stud bolts 42 with only a layer of mica therebetween.

While it is preferred to employ the specific construction and arrangement of parts shown and described it will be understood that this construction and arrangement is not essential except so far as specified in the claims and may be changed or modified without departing from the broader features of the invention.

The invention having been described, what is claimed is:—

1. A sadiron comprising a pointed base member, a heater assembly comprising substantially flat heater strips connected at one end in a substantially triangular formation and superimposed above the base member, a substantially circular thermostatic assembly received in a recessed portion of the base member and spaced rearwardly from the pointed end of the base, a weight member superimposed upon the heater assembly and serving to maintain the thermostatic control within the recess, and means for connecting the weight member to the base.

2. A sadiron comprising a base member having a recess formed therein, a thermostatic assembly received within the recess and having a disk of insulating material supported in the top portion substantially flush with the surface of the base member, a weight member, a heater element interposed between the weight member and the top portion of the base, electrical connection between opposite ends of the heater element and the thermostatic assembly, and means for connecting the base and weight member together.

3. A sadiron including a base member having an annular recess formed therein surmounted by an enlarged recess forming a shoulder, a thermostatic member having a base resting in the enlarged recess on the shoulder and an operating portion projecting within the recess in the direction of the under face of the sadiron base, and an upper base section for the iron in the form of a weight member resting on the thermostatic base to retain it in position in the recess.

4. A sadiron comprising a substantially flat base having a recess formed therein at the central portion of the base, a thermostatic assembly received within the recess, a weight member superimposed above the base, a heating element interposed between the weight member and base, and through-bolts extending through the weight member and into the base upon opposite sides of the recess in which the thermostatic assembly is received.

5. A sadiron including a base member having an annular recess formed therein surmounted by an enlarged recess forming a shoulder, a thermostatic member having a base resting in the enlarged recess on the shoulder and an operating portion projecting within the recess in the direction of the under face of the sadiron base, and an upper base section for the iron in the form of a weight member resting on the thermostat base to retain it in position in the recess, the thermostat member having projections extending thereabove and the weight member having recesses receiving the projections in spaced relation thereto.

6. A sadiron including a base having a shouldered recess formed therein, a thermostat member in the recess having a base portion engaging the shoulder thereof, heater members supported by the base, a weight member surmounting the heater members and a thermostat member, a handle portion for the iron, and fastening members passing through the handle, weight and base portions for securing the entire iron in assembled relation.

7. A device of the character described comprising an electrical resistance element, a thermostat for controlling current supplied to the element, insulation between the element and thermostat, and means for holding said parts together said means being symmetrically located with respect to said thermostat.

8. A device of the character described comprising an electrical resistance element, a thermostat for controlling current supplied to the element, a layer of insulation between the element and thermostat, and means including a stud extending through the resistance element for clamping said parts together said means being symmetrically located with respect to said thermostat.

9. A separable heating element assembly comprising a resistance element adapted to heat up on the passage of a suitable current through it, a thermostat adapted to control the current passing through the resistance element, insulating means separating the thermostat and the resistance element, and means mechanically interconnecting the resistance unit, thermostat, and insulator and holding them as one unit, whereby said one unit may be inserted into or removed from a heating device in one operation.

10. A separable heating assembly comprising a resistance element mounted on a refractory insulator, a thermostat adapted to control the passage of electricity through said resistance element, and means mechanically interconnecting the resistance unit, and thermostat and holding them as one unit, whereby said one unit may be inserted into or removed from a heating device in one operation.

11. A unitary structure for an electrically heated device, comprising an electric heating unit and a thermostatically-controlled switch assembly directly secured thereto.

12. A unitary electric heating means and temperature-controlling means for an electrically heated device, said temperature controlling means being secured to said heating means and removable therewith as a unit from said device.

In testimony whereof, I have hereunto subscribed my name this 15th day of February, 1926.

JOHN ALBY SPENCER.